(12) United States Patent
Karibe

(10) Patent No.: US 11,381,748 B2
(45) Date of Patent: Jul. 5, 2022

(54) IMAGE PICKUP APPARATUS, CONTROL METHOD, AND MEMORY MEDIUM, CAPABLE OF REDUCING BLUR BY MOVING IMAGE SENSOR

(71) Applicant: CANON KABUSHIKI KAISHA, Tokyo (JP)

(72) Inventor: Kazuya Karibe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/210,265

(22) Filed: Mar. 23, 2021

(65) Prior Publication Data
US 2021/0306565 A1 Sep. 30, 2021

(30) Foreign Application Priority Data
Mar. 25, 2020 (JP) .............................. JP2020-054705

(51) Int. Cl.
*H04N 5/232* (2006.01)
*H04N 5/225* (2006.01)

(52) U.S. Cl.
CPC ....... *H04N 5/23287* (2013.01); *H04N 5/2253* (2013.01); *H04N 5/23245* (2013.01); *H04N 5/23258* (2013.01)

(58) Field of Classification Search
None
See application file for complete search history.

(56) References Cited

U.S. PATENT DOCUMENTS

| 8,224,168 B2 * | 7/2012 | Noda ................. H04N 5/23248 396/55 |
| 2008/0211922 A1 * | 9/2008 | Murashima ............. G03B 5/02 348/E5.037 |
| 2008/0298791 A1 * | 12/2008 | Noda ....................... G03B 7/00 396/55 |
| 2009/0213233 A1 * | 8/2009 | Kido .................... H04N 5/3532 348/208.4 |
| 2009/0231450 A1 * | 9/2009 | Tanaka .................. H04N 5/238 348/208.7 |
| 2009/0251550 A1 * | 10/2009 | Nakamura .............. G03B 5/00 348/208.4 |

(Continued)

FOREIGN PATENT DOCUMENTS

JP 2008-182447 A 8/2008

*Primary Examiner* — Cynthia Segura
(74) *Attorney, Agent, or Firm* — Cowan, Liebowitz & Latman, P.C.

(57) ABSTRACT

An image pickup apparatus includes an image sensor configured to acquire an image, an image-stabilization mechanism configured to reduce blur, a shutter apparatus including a front blade group and a rear blade group, and a control unit configured to provide control on image stabilization. The image sensor has a first mode for acquiring the image based on light passing through an area formed by the front blade group and the rear blade group, and a second mode for acquiring the image based on light passing through an area between an electronic front curtain of the image sensor and the rear blade group. In the first mode, the control unit provides the control on the image stabilization. In the second mode, the control unit determines whether or not to provide the control on the image stabilization, based on a shutter speed of the shutter apparatus.

7 Claims, 8 Drawing Sheets

(56) References Cited

U.S. PATENT DOCUMENTS

| | | | |
|---|---|---|---|
| 2012/0147201 A1* | 6/2012 | Asukabe | H04N 5/23274 |
| | | | 348/208.1 |
| 2015/0256756 A1* | 9/2015 | Sakurai | H04N 5/23258 |
| | | | 348/208.5 |
| 2018/0011387 A1* | 1/2018 | Murashima | G03B 9/36 |
| 2019/0158748 A1* | 5/2019 | Maruhashi | H04N 5/23241 |
| 2019/0349527 A1* | 11/2019 | Masuda | G03B 13/36 |
| 2020/0326608 A1* | 10/2020 | Niwamae | G03B 9/14 |
| 2020/0404183 A1* | 12/2020 | Kimura | H04N 5/23254 |
| 2021/0337122 A1* | 10/2021 | Shibata | H04N 5/23287 |

* cited by examiner

IMAGE PICKUP APPARATUS, CONTROL METHOD, AND MEMORY MEDIUM, CAPABLE OF REDUCING BLUR BY MOVING IMAGE SENSOR

BACKGROUND OF THE INVENTION

Field of the Invention

The present invention relates to an image pickup apparatus having a mechanical-shutter image pickup mode and an electronic-front-curtain image pickup mode.

Description of the Related Art

Conventionally, an image pickup apparatus has been known which has a mechanical-shutter image pickup mode. The mechanical-shutter image pickup mode continuously exposes an image pickup plane to light from a slit formed by a mechanical shutter, which includes two shutter blades of a front blade group and a rear blade group, of a focal plane shutter provided inside a camera. An image pickup apparatus is also known which has an electronic-front-curtain image pickup mode for performing image pickup operation by using both a mechanical shutter and an electronic shutter. Such an image pickup apparatus captures an image by using a rear blade group (rear curtain) of a focal plane shutter and an electronic front curtain that performs charge-accumulation-start scanning (reset scanning) of the image sensor prior to traveling of the rear curtain.

In recent years, an image pickup apparatus has been proposed which includes an image-stabilization mechanism configured to reduce blur by moving the image sensor. However, if the image sensor is driven for reducing blur during electronic-front-curtain image pickup, the light amount varies which passes through an area between the reset scanning of pixels of the image sensor and the rear blade group, the image sensor is exposed to the varying light amount, and thus a proper image cannot be acquired. As the shutter speed becomes faster, a width of the area is narrower between the reset scanning of the pixels of the image sensor and the rear blade group of the mechanical shutter, and exposure of the image is more largely affected by the driving of the image sensor.

Japanese Patent Laid-Open No. ("JP") 2008-182447 discloses a camera which allows providing control on the image stabilization when the shutter speed of the camera during image pickup is slower than a predetermined shutter speed, and prohibits providing the control on the image stabilization when the shutter speed is faster than the predetermined shutter speed.

When the shutter speed is faster than the predetermined shutter speed, the camera disclosed in JP 2008-182447 prohibits the image stabilization for both mechanical-shutter image pickup and electronic-front-curtain image pickup. Hence, in the mechanical-shutter image pickup, when the shutter speed is faster than the predetermined shutter speed, the image stabilization is performed by neither the image sensor nor a lens, and thus the captured image may be blurred.

SUMMARY OF THE INVENTION

The present invention provides an image pickup apparatus, a control method, and a memory medium each of which can acquire an image with proper exposure while properly reducing blur.

An image pickup apparatus as one aspect of the present invention includes an image sensor configured to acquire an image, an image-stabilization mechanism configured to reduce blur by moving the image sensor based on a shake amount detected by a shake detection unit, a shutter apparatus including a front blade group and a rear blade group, and a control unit configured to provide control on image stabilization by the image-stabilization mechanism. The image sensor has a first mode for acquiring the image based on light passing through an area formed by the front blade group and the rear blade group, and a second mode for acquiring the image based on light passing through an area between an electronic front curtain of the image sensor and the rear blade group. In the first mode, the control unit provides the control on the image stabilization. In the second mode, the control unit determines whether or not to provide the control on the image stabilization, based on a shutter speed of the shutter apparatus A control method as another aspect of the present invention includes steps of acquiring an image by using an image sensor, and reducing blur by providing control on image stabilization by an image-stabilization mechanism and moving the image sensor based on a shake amount detected by a shake detection unit. The image sensor has a first mode for acquiring the image based on light passing through an area formed by a front blade group and a rear blade group, and a second mode for acquiring the image based on light passing through an area between an electronic front curtain of the image sensor and the rear blade group. In the first mode, the step of reducing blur provides the control on the image stabilization. In the second mode, the step of reducing blur determines whether or not to provide the control on the image stabilization, based on a shutter speed of the shutter apparatus.

A storage medium storing a computer program that enables a computer to execute the above control method also constitute another aspect of the present invention.

Further features of the present invention will become apparent from the following description of exemplary embodiments with reference to the attached drawings.

DESCRIPTION OF THE EMBODIMENTS

Hereinafter, embodiments according to the present invention will be described in detail with reference to the drawings.

First Embodiment

Figure 1:
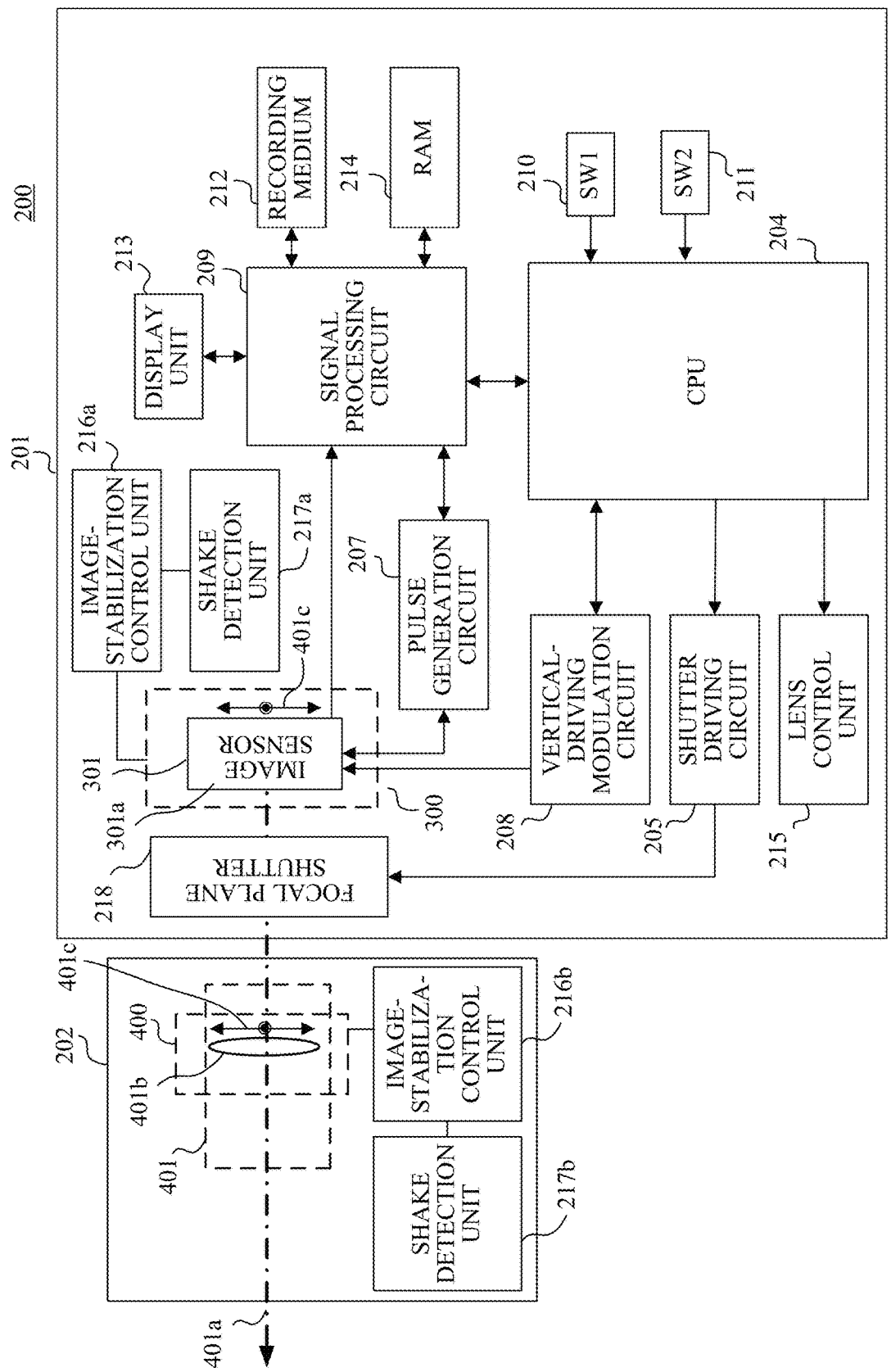
FIG. 1 is a block diagram illustrating an image pickup apparatus according to each embodiment.

First, a description will be given of an image pickup apparatus in the first embodiment according to the present invention with reference to FIG. 1. FIG. 1 is a block diagram illustrating an image pickup apparatus 200. The image pickup apparatus 200 includes a camera body 201 as an image pickup apparatus body having an image sensor 301, and an image pickup lens 202 that is an interchangeable lens and as a lens apparatus that is detachably attachable to the camera body 201. In the image pickup apparatus 200, methods can be selected of a mechanical-shutter method using a front blade group 4 and a rear blade group 5 of a focal plane shutter 218, and an electronic-front-curtain method using reset scanning, that is also referred to as electronic-front-curtain scanning, of the image sensor 301 and the rear blade group 5. However, this embodiment is not limited to this, and may be applied to an image pickup apparatus in which an image pickup lens and an image pickup apparatus body are integrally configured.

The image pickup lens 202 includes an image pickup optical system 401 having an image stabilization lens 401b. In this embodiment, a plane orthogonal to an optical axis 401a of the image pickup optical system 401 is referred to as an optical-axis orthogonal plane 401c. The image pickup lens 202 may include a diaphragm.

The camera body 201 and the image pickup lens 202 include image-stabilization control units 216a and 216b, shake detection units 217a and 217b, and image-stabilization mechanisms 300 and 400, respectively. The image sensor 301 includes a CMOS image sensor, a CCD image sensor, or the like, and is included in the camera body 201 so that an image pickup plane 301a faces object (not illustrated) side and so that the image sensor 301 is orthogonal to the optical axis 401a. The image sensor 301 is configured to generate an image signal by photoelectrically converting an object light beam on the image pickup plane 301a, the object light being imaged by the image pickup optical system 401 which will be described later. The image pickup optical system 401 includes a lens group (not illustrated) in the image pickup lens 202, and is configured to image the object light beam (not illustrated) on the image pickup plane 301a of the image sensor 301. The image pickup optical system 401 includes the image stabilization lens 401b which will be described later.

The image pickup optical system 401 in the image pickup lens 202 is configured to form an optical axis 401a. In the image pickup apparatus 200, the image sensor 301 is accurately disposed relative to the optical axis 401a, by connecting the image pickup lens 202 and image sensor 301 via a mount portion (not illustrated) in the camera body 201. The image sensor 301 is connected to a frame member (not illustrated) in the camera body 201 via the image-stabilization mechanism 300 which will be described later. The image pickup lens 202 is connected to a frame member (not illustrated) via a mount portion (not illustrated).

In the image pickup apparatus 200, the image sensor 301 and the image stabilization lens 401b function as image stabilization units, respectively. The image sensor 301 and the image stabilization lens 401b are configured to reduce blur by being translated or rotated on the optical-axis orthogonal plane 401c. More specifically, when an orientation of the image pickup apparatus 200 changes relative to an object (not illustrated) during image pickup, that is, when shake occurs, the imaging position of the object light beam changes on the image pickup plane 301a of the image sensor 301 and blur occurs in the image. When such a change in the orientation is sufficiently small, the change in the imaging position is uniform on the image pickup plane 301a and can be regarded as a translational or rotational movement in the optical-axis orthogonal plane 401c, that is, regarded as image plane blur. The image stabilization can be performed by controlling the translational or rotational movement of the image sensor 301 on the optical-axis orthogonal plane 401c so as to reduce or cancel this image plane blur. The image stabilization lens 401b can refract the optical axis 401a by being translated on the optical-axis orthogonal plane 401c. The image stabilization can be performed by controlling the translational movement of the image stabilization lens 401b on the optical-axis orthogonal plane 401c so as to reduce or cancel the above-mentioned image plane blur. The details of the principle and control of the image stabilization are known, and therefore a detailed description thereof will be omitted.

The image-stabilization mechanisms 300 and 400 are respectively configured to movably hold the image sensor 301 and the image stabilization lens 401b each of which is the image stabilization unit and to control movement thereof, within certain ranges of the optical-axis orthogonal plane 401c on the optical axis 401a. In general, the wider the movable range, the larger the reducible image plane blur amount, which makes it easier to perform image stabilization in more image pickup scenes. However, the sizes increase of the camera body 201 and the image pickup lens 202, and thus the movable ranges are set to proper necessary amounts.

The image-stabilization mechanism 300 is also referred to as a first image-stabilization mechanism hereinafter, and includes a fixed portion, a movable portion, and a plurality of driving-force generators, none of which is illustrated in FIG. 1. The fixed portion is configured to support the movable portion with three degrees of freedom, and to translate and rotate the movable portion in a predetermined driving plane relative to the fixed portion. The fixed portion is fixed to a frame member (not illustrated) and the movable portion holds the image sensor 301, so that the image sensor 301 can be translated and rotated in a direction of the optical-axis orthogonal plane 401c. That is, the image-stabilization mechanism 300 functions as a driving apparatus controllable of three-axis driving, i.e., a so-called XYθ stage.

As in the image-stabilization mechanism 300, the image-stabilization mechanism 400 is also referred to as a second image-stabilization mechanism hereinafter, and includes a fixed portion and a movable portion, and a plurality of driving-force generators, none of which is illustrated in FIG. 1. The fixed portion is configured to support the movable portion with two degrees of freedom, and to translate the movable portion in a predetermined driving plane relative to the fixed portion. The fixed portion is fixed to the frame member (not illustrated) via a housing of the image pickup lens 202 and the mount portion (not illustrated), and the movable portion holds the image stabilization lens 401b, so that the image stabilization lens 401b can be translated on the optical-axis orthogonal plane 401c. That is, the image-stabilization mechanism 400 functions as a driving apparatus controllable of two-axis driving, i.e., a so-called XY stage.

The image-stabilization control units 216a and 216b of the camera body 201 and the image pickup lens 202 are configured to control movement of the image sensor 301 and the image stabilization lens 401b by controlling driving of the image-stabilization mechanisms 300 and 400, respectively, in order to reduce blur. At this time, both movement target values of the image sensor 301 and the optical axis 401a are calculated based on shake information of the image pickup apparatus 200. The shake information can be acquired from the shake detection unit 217a of the camera body 201 and the shake detection unit 217b of the image pickup lens 202.

The shake detection units 217a and 217b is configured to detect information on an angle variation amount and a movement amount in each direction of the image pickup apparatus 200. Each of the shake detection units 217a and 217b includes, for example, a gyro sensor and an acceleration sensor, and is configured to detect an angular velocity and acceleration in each direction of the image pickup apparatus 200. The image-stabilization control unit 216a of the camera body 201 and the image-stabilization control unit 216b of the image pickup lens 202 are configured to integrate the angular velocity and the acceleration to calculate, as the shake information, the angle variation amount and the movement amount in each direction of the image pickup apparatus 200. As described above, the image-stabilization control units 216a and 216b control the driving of the image-stabilization mechanisms 300 and 400 by calculating the movement target values of the image sensor 301 and the image stabilization lens 401b. The image pickup apparatus 200 may not necessarily include the image-stabilization mechanism 400. In that case, an image stabilization unit, that is the image stabilization lens 401b, of the image pickup lens 202 is disposed fixedly to the optical axis 401a.

The focal plane shutter 218 as the shutter apparatus is disposed on the object side of the image sensor 301, and includes the front blade group 4, the rear blade group 5, a front driving source 24, and a rear driving source 25 as described later. A CPU 204 as a control unit is configured to control operation on the focal plane shutter 218 including the front blade group 4, the rear blade group 5, a front driving source 24, and a rear driving source 25 via a shutter driving circuit 205, the operation including start timing of traveling of the blade groups and driving of a motor. The CPU 204 is also configured to control a scanning pattern of the reset scanning by the a vertical-driving modulation circuit 208 as described later.

A first switch (SW1) 210 is a switch for starting preparation for image pickup. A second switch (SW2) 211 is a switch for starting the image pickup. The first switch 210 and the second switch 211 are configured as a two-step switch. The first switch 210 turns on in a first stroke, and the second switch 211 turns on in a second stroke.

The lens control unit 215 is configured to output, to the CPU 204, image pickup condition information, that is information on condition of the image pickup lens 202, i.e., lens information, such as a focal length of the image pickup lens 202, an aperture diameter that is a diaphragm value, an exit pupil diameter, and a distance between an exit pupil and the image sensor 301. The lens control unit 215 is configured to control operation or driving of the image pickup lens 202 including the diaphragm, in response to an instruction from the CPU 204. The CPU 204 is configured to provide calculation and control on a signal processing circuit 209, the vertical-driving modulation circuit 208 as a scanning unit, the shutter driving circuit 205, and the lens control unit 215. The CPU 204 is configured to provide a scanning clock of a horizontal driving pulse and a predetermined control pulse to the image sensor 301 via a pulse generation circuit 207.

The vertical-driving modulation circuit 208 is configured to modulate clock for vertical scanning among scanning clocks generated by the pulse generation circuit 207 to a predetermined clock frequency and is configured to input the modulated clock to the image sensor 301. The vertical-driving modulation circuit 208 is configured to set a scanning pattern that is a scanning curve of the reset scanning as the electronic front curtain, based on an instruction from the CPU 204. The vertical-driving modulation circuit 208 is a scanning unit as the electronic front curtain, and is configured to determine the scanning pattern of the reset scanning. Based on an instruction from the CPU 204, the vertical-driving modulation circuit 208 is configured to perform the reset scanning of accumulated charges in an order from top to bottom or from bottom to top, that is, perform scanning to start charge accumulation for each pixel of the image sensor 301.

The pulse generation circuit 207 is configured to output a clock signal to the signal processing circuit 209. The signal processing circuit 209 is configured to generate image data by performing predetermined processing such as color processing, gamma correction, or the like on a signal read from the image sensor 301. A recording medium 212 is configured to record the image data processed by the signal processing circuit 209. A display unit 213 includes a liquid crystal display (LCD) or the like, and is configured to display a captured image, various menu screens, and the like. A RAM 214. i.e., a random access memory, is a memory unit that is connected to the signal processing circuit 209 and is configured to temporarily store the image data and the like.

Figure 2A:
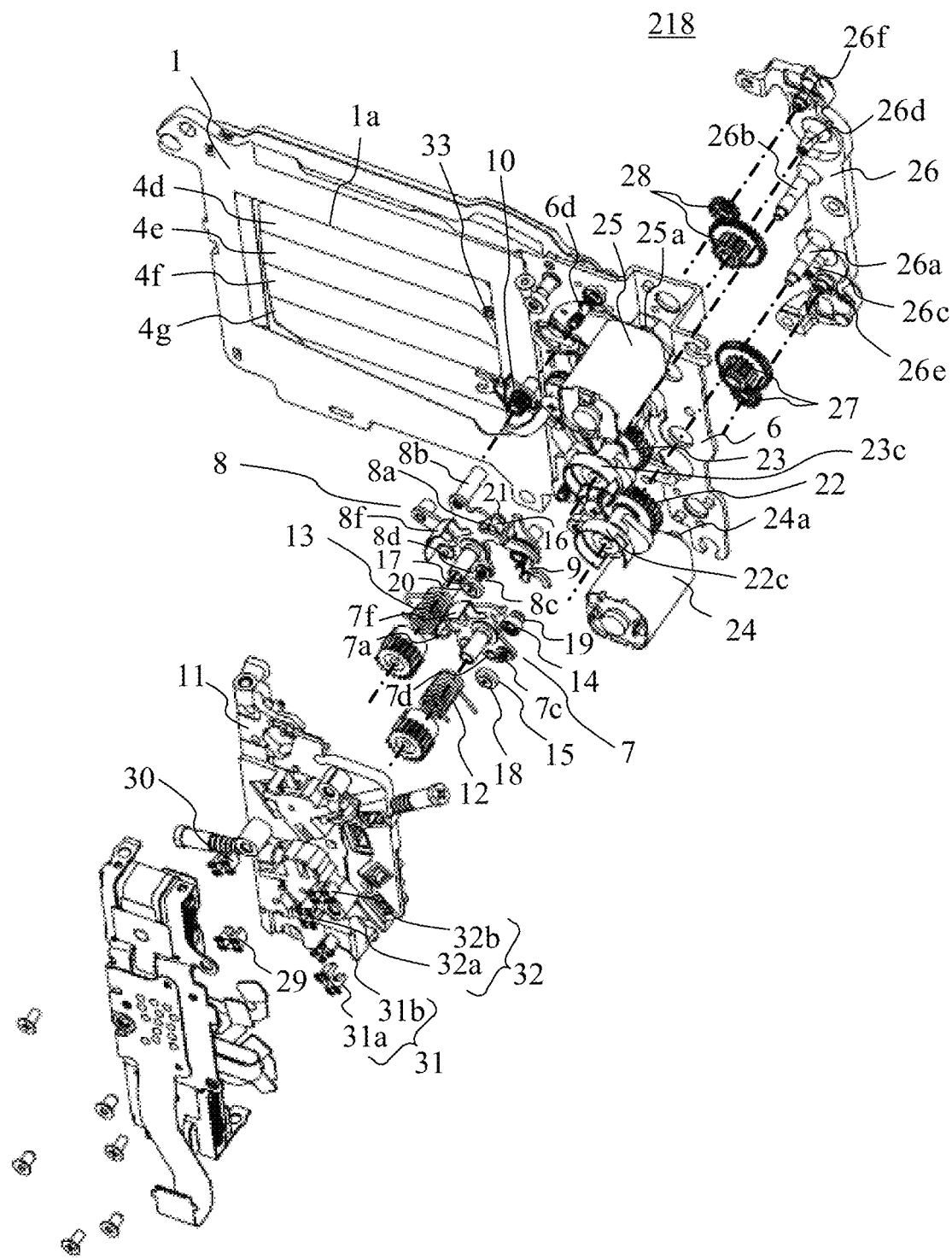
FIG. 2A is an exploded perspective view illustrating a shutter apparatus according to each embodiment.
Figure 2B:
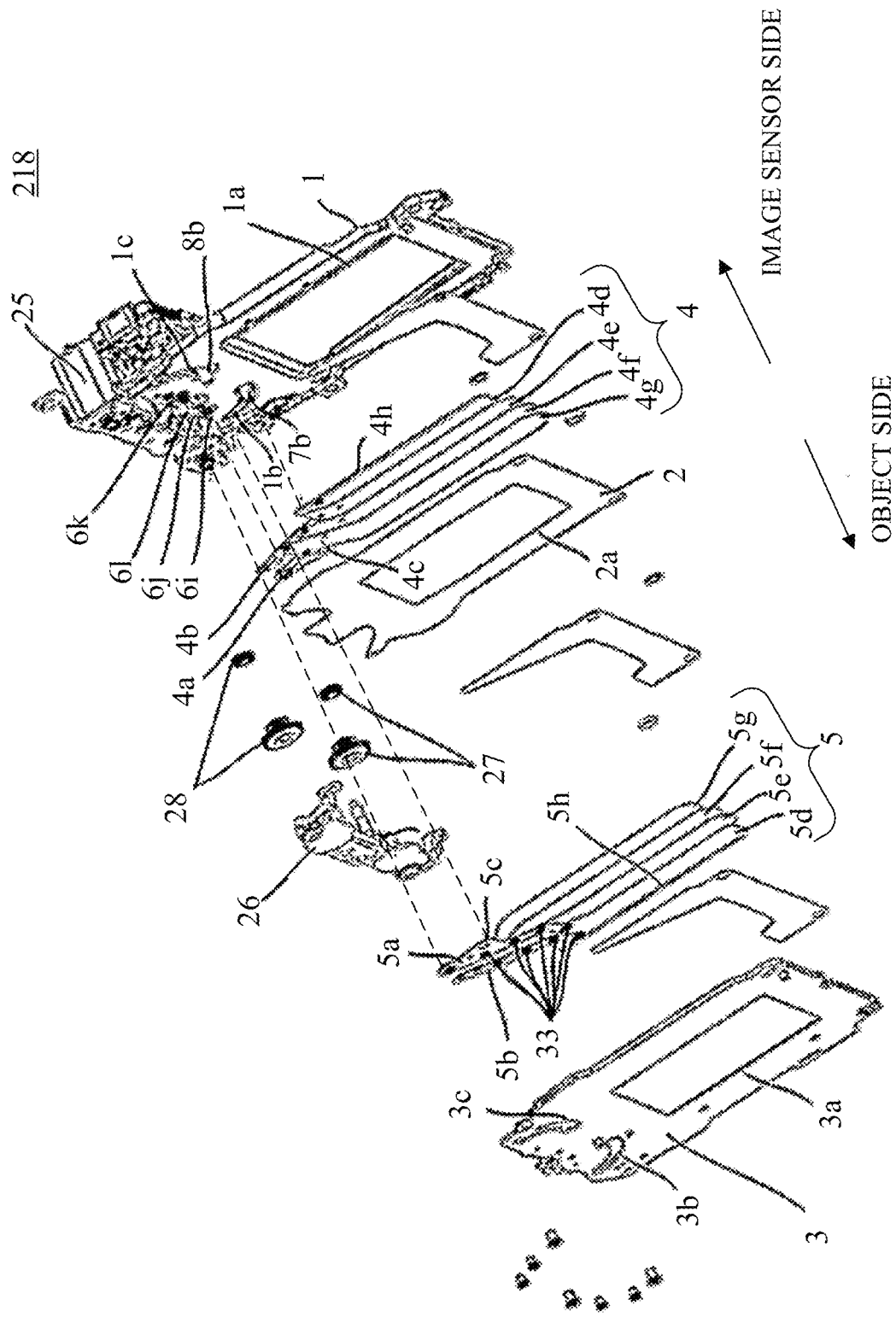
FIG. 2B is an exploded perspective view illustrating the shutter apparatus according to each embodiment.
Figure 3A:
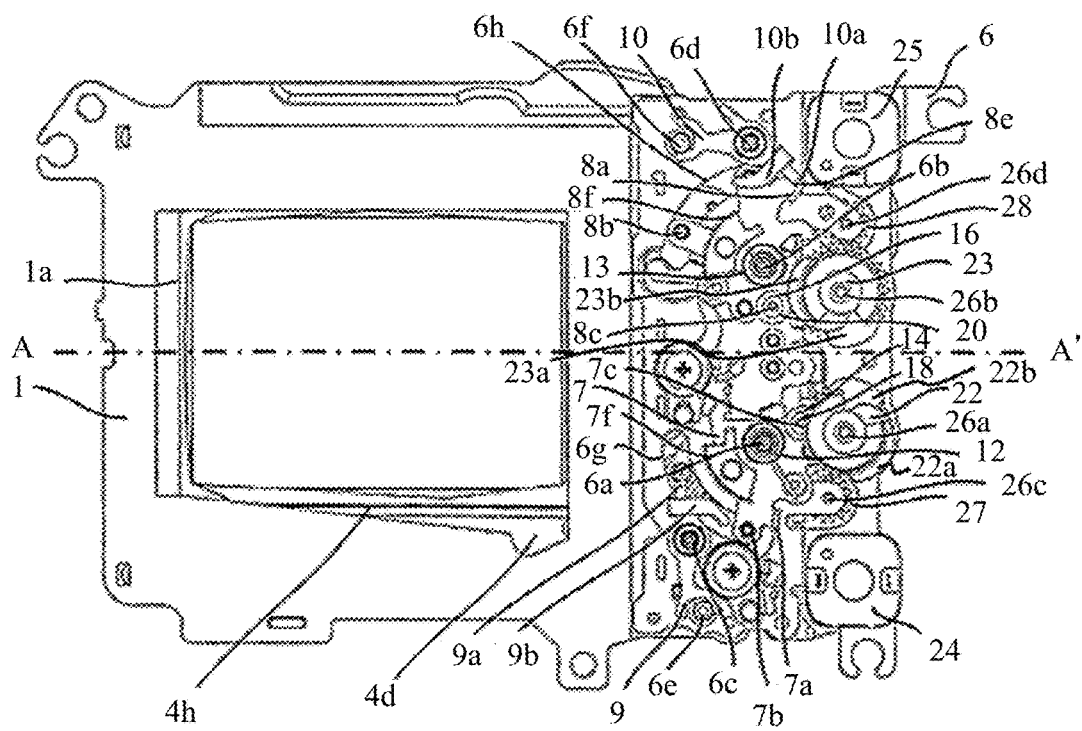
FIGS. 3A and 3B are plan views each illustrating the shutter apparatus at an image-pickup standby state according to each embodiment.
Figure 3B:
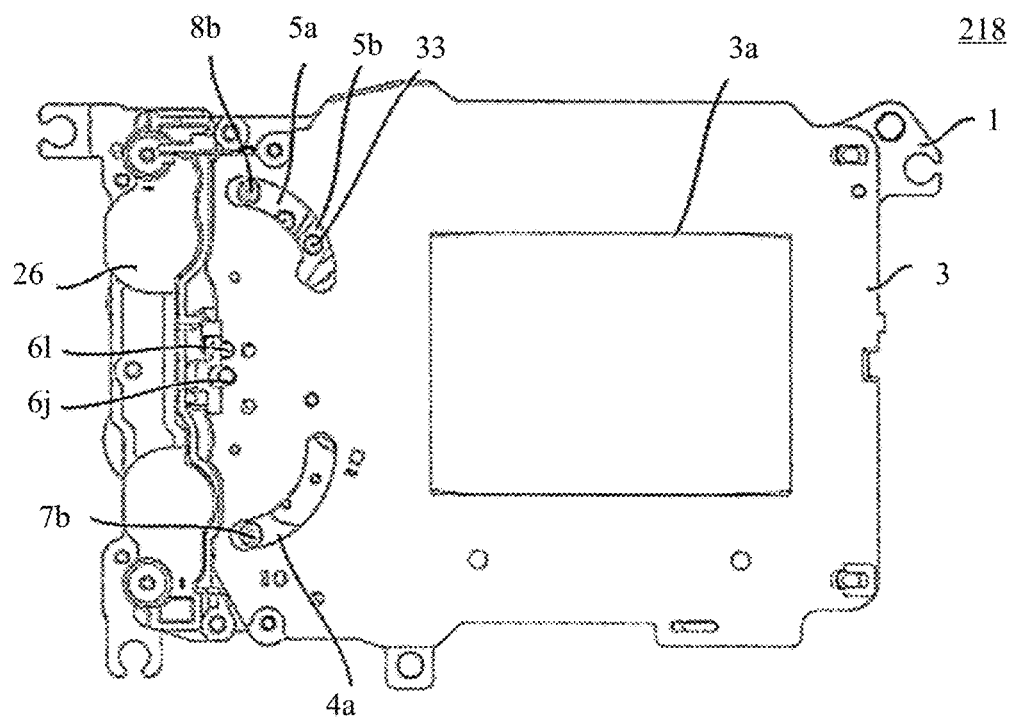

Next, the configuration will be described of the focal plane shutter 218 in this embodiment with reference to FIGS. 2A to 3B. FIG. 2A is an exploded perspective view illustrating the focal plane shutter 218 viewed from side to which the image sensor 301 is attached, that is also referred to as image sensor side. FIG. 2B is an exploded perspective view illustrating the focal plane shutter 218 viewed from side to which the image pickup lens 202 is attached, that is also referred to as object side. FIG. 3A is a plan view illustrating the focal plane shutter 218 at an image-pickup standby state as viewed from the image sensor side. FIG. 3B is a plan view illustrating the focal plane shutter 218 at an image-pickup standby state as viewed from the object side.

A partition plate 2 and a cover plate 3 are attached to the object side of a shutter base plate 1 in this order with a predetermined distance. Apertures 1a, 2a, and 3a having similar shapes are formed on the three plate members of the shutter base plate 1, partition plate 2, and cover plate 3. A rectangular aperture formed by overlapping the three apertures 1a to 3a specifies a light beam that passes through the focal plane shutter 218. Two blade chambers are formed between the three plate members, and shutter blades each including a light-shielding blade and a blade arm are individually disposed as the front blade group 4 and the rear blade group 5 in the blade chambers.

A screw fastens an auxiliary base plate 6 made of metal and the shutter base plate 1 so as to improve a strength of the shutter base plate 1 and to fasten various metal shafts. A plurality of shafts 6a, 6b. 6c, 6d, 6e, and 6f are erected on the image sensor side of the auxiliary base plate 6. A front driving member 7, a rear driving member 8, a front locking member 9, and a rear locking member 10 are rotatably attached to the shafts 6a, 6b, 6c, and 6d, respectively. Screws fasten the front driving source 24 and the rear driving source 25, each of which is a DC motor or the like, to the object side of the auxiliary base plate 6, respectively.

Screws fasten a gear base plate 26 to the object side of the auxiliary base plate 6. A front cam gear 22 and a rear cam gear 23 are respectively rotatably attached to shafts 26a and 26b which are erected on the image sensor side of the gear base plate 26. A front deceleration gear group 27 is rotatably supported by shafts 26c and 26e, and a rear deceleration gear group 28 is rotatably supported by shafts 26d and 26f, the gear base plate 26 including the shafts 26c to 26f on the image sensor side. An output shaft 24a of the front driving source 24, the front deceleration gear group 27, and the front cam gear 22 are engaged with each other. A main power shaft 25a of the rear driving source 25, the rear deceleration gear group 28, and the rear cam gear 23 are engaged with each other. Thereby, torques of the front driving source 24 and the rear driving source 25 are transmitted to the front cam gear 22 and the rear cam gear 23, respectively. The front driving source 24 and the rear driving source 25 can be used for both forward rotation and reverse rotation. In this embodiment, rotation in a direction in which the front cam gear 22 and the rear cam gear 23 rotate counterclockwise in FIG. 3A is defined as forward rotation.

The line AA' illustrated in FIG. 3A indicates a line passing through a center of the aperture. Parts driving the front blade group 4 are disposed in an order of, from the line AA' side, the shaft 26a which is a rotational shaft of the front cam gear 22, the shaft 6a which is a rotational shaft of the front driving member 7, the shaft 26c which is a rotational shaft of the front deceleration gear group 27, and the output shaft 24a of the front driving source 24. On the other hand, parts driving the rear blade group 5 are disposed in an order of, from the line AA' side, the shaft 26b which is a rotational shaft of the rear cam gear 23, the shaft 6b which is a rotational shaft of the rear driving member 8, the shaft 26d which is a rotational shaft of the rear deceleration gear group 28, and the main power shaft 25a of the rear driving source 25.

The above arrangements can be realized by operating the focal plane shutter 218 by two driving sources, the front driving source 24 and the rear driving source 25, by dispersing the torque required for driving the front blade group 4 and the rear blade group 5, and by downsizing the front cam gear 22 and the rear cam gear 23. As a result, size can be reduced of the entire focal plane shutter 218.

The driving members 7 and 8 are forced counterclockwise when viewed from the image sensor side by biasing force of the driving springs 12 and 13. The driving members 7 and 8 are rotated clockwise by the cam gears 22 and 23 against the biasing force of the driving springs 12 and 13. At the set position, the driving members 7 and 8 are locked by engaging locking portions 7a and 8a provided in the driving members 7 and 8 with locking portions 9a and 10a of the locking members 9 and 10, respectively. The driving members 7 and 8 include driving pins 7b and 8b. The driving pins 7b and 8b respectively pass through three pairs of long holes 1b and 1c, 6g and 6h, and 3b and 3c of the shutter base plate 1, the auxiliary base plate 6, and the cover plate 3, and respectively engage with the long holes 4c and 5c of the blade arms 4a and 5a. Rollers 14, 15, 16 and 17 are rotatably attached to the driving members 7 and 8. The front cam gear 22 suitably performs set operation of the front driving member 7 via the rollers 14 and 15, and the rear cam gear 23 suitably performs set operation of the rear driving member 8 via the rollers 16 and 17.

In this embodiment, the front cam gear 22 is formed with a cam surface 22a and a cam surface 22b, and the rear cam gear 23 is formed with a cam surface 23a and a cam surface 23b. In the set operation, the two rollers 14 and 15 and the two rollers 16 and 17 respectively attached to the driving members 7 and 8 come into contact with the two cam surfaces in sequence. Thereby, rotation amounts of the driving members 7 and 8 and the cam gears 22 and 23 during the set operation are equalized, so that the maximum load during the set operation can be reduced. Depending on tolerances of the related parts, the driving members 7 and 8 may not be disposed on the set positions within the tolerances. In that case, the set positions of the driving members 7 and 8 can be adjusted by exchanging the rollers 15 and 17.

Blade phase detection units 29 and 30 and cam phase detection units 31 and 32 are non-contact optical phase detection units and are attached to a pressing base plate 11 disposed on the image sensor side of the auxiliary base plate 6. This embodiment uses photo interrupters as the blade phase detection units 29 and 30 and the cam phase detection units 31 and 32. The blade phase detection units 29 and 30 are configured to detect blade phases by determining light-shielding states of light shielded by detected portions 7f and 8f of the driving members 7 and 8. The cam phase detection units 31 and 32 are configured to detect cam phases by determining light-shielding states of light shielded by detected portions 22c and 23c of the cam gears 22 and 23. In this embodiment, the phases are determined by using two photo interrupters 31a and 31b and two photo interrupters 32a and 32b as the cam phase detection units 31 and 32, respectively.

The front blade group 4 and the rear blade group 5 of this embodiment includes two blade arms 4a and 4b, and 5a and 5b and four light-shielding blades 4d, 4e, 4f and 4g, and 5d, 5e, 5f, and 5g, respectively. In the front blade group 4, the two blade arms 4a and 4b are rotatably attached to shafts 6i and 6j on the object side of the auxiliary base plate 6. The four blades 4d, 4e, 4f, and 4g are rotatably supported by the blade arms 4a and 4b via a connecting shaft 33. As described above, the long hole 4c is formed on the blade arm 4a, and the driving pin 7b of the front driving member 7 engages with the long hole 4c. In the rear blade group 5, two blade arms 5a and 5b are rotatably attached to shafts 6k and 6l on the object side of the auxiliary base plate 6. The four light-shielding blades 5d, 5e, 5f, and 5g are rotatably supported by the blade arms 5a and 5b via the connecting shaft 33. As described above, the long hole 5c is formed on the blade arm 5a, and the driving pin 8b of the rear driving member 8 engages with the long hole 5c. The focal plane shutter 218 is fixed to a frame member (not illustrated).

Figure 4:
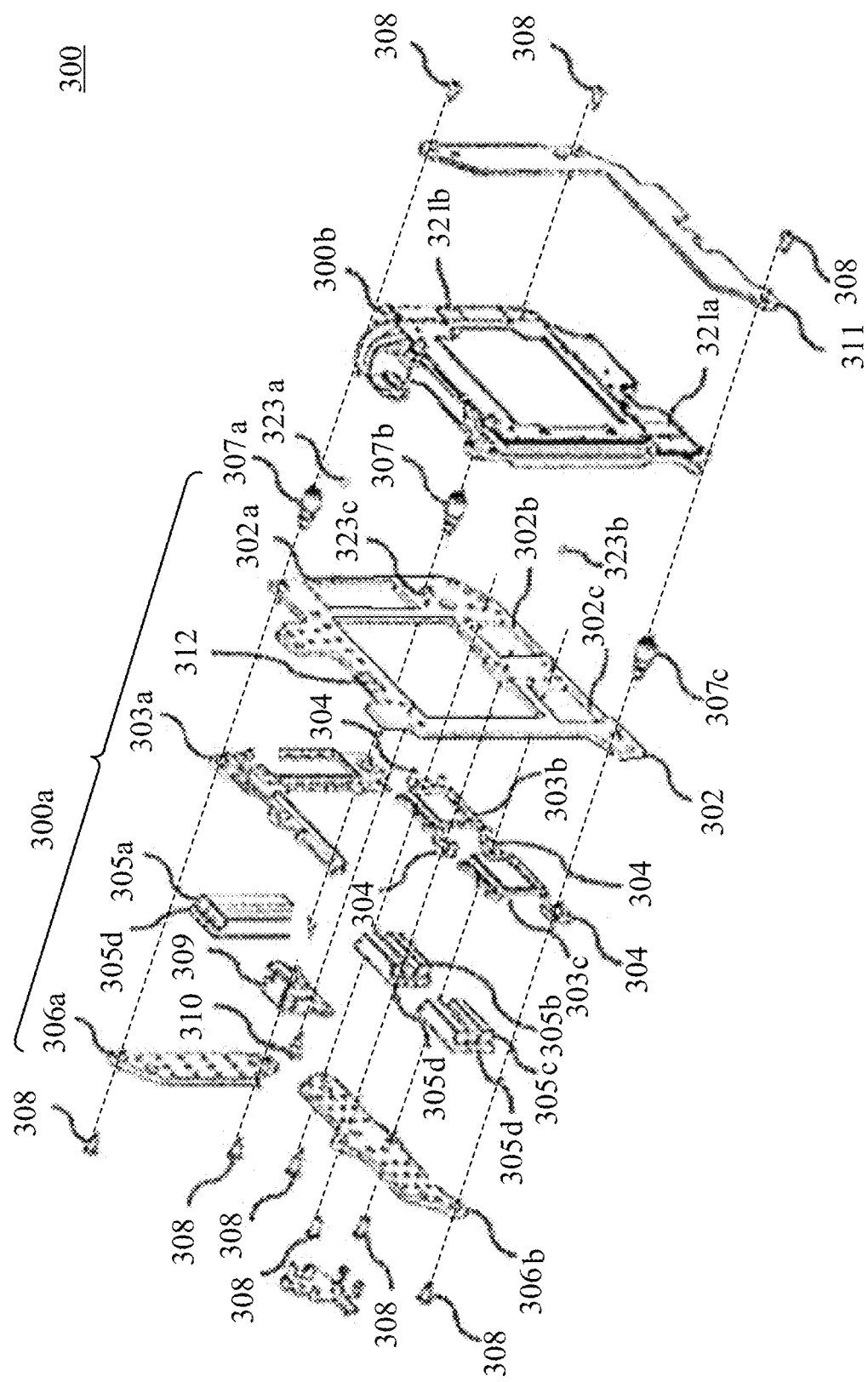
FIG. 4 is an exploded perspective view illustrating an image-stabilization mechanism viewed from object side according to each embodiment.
Figure 5:
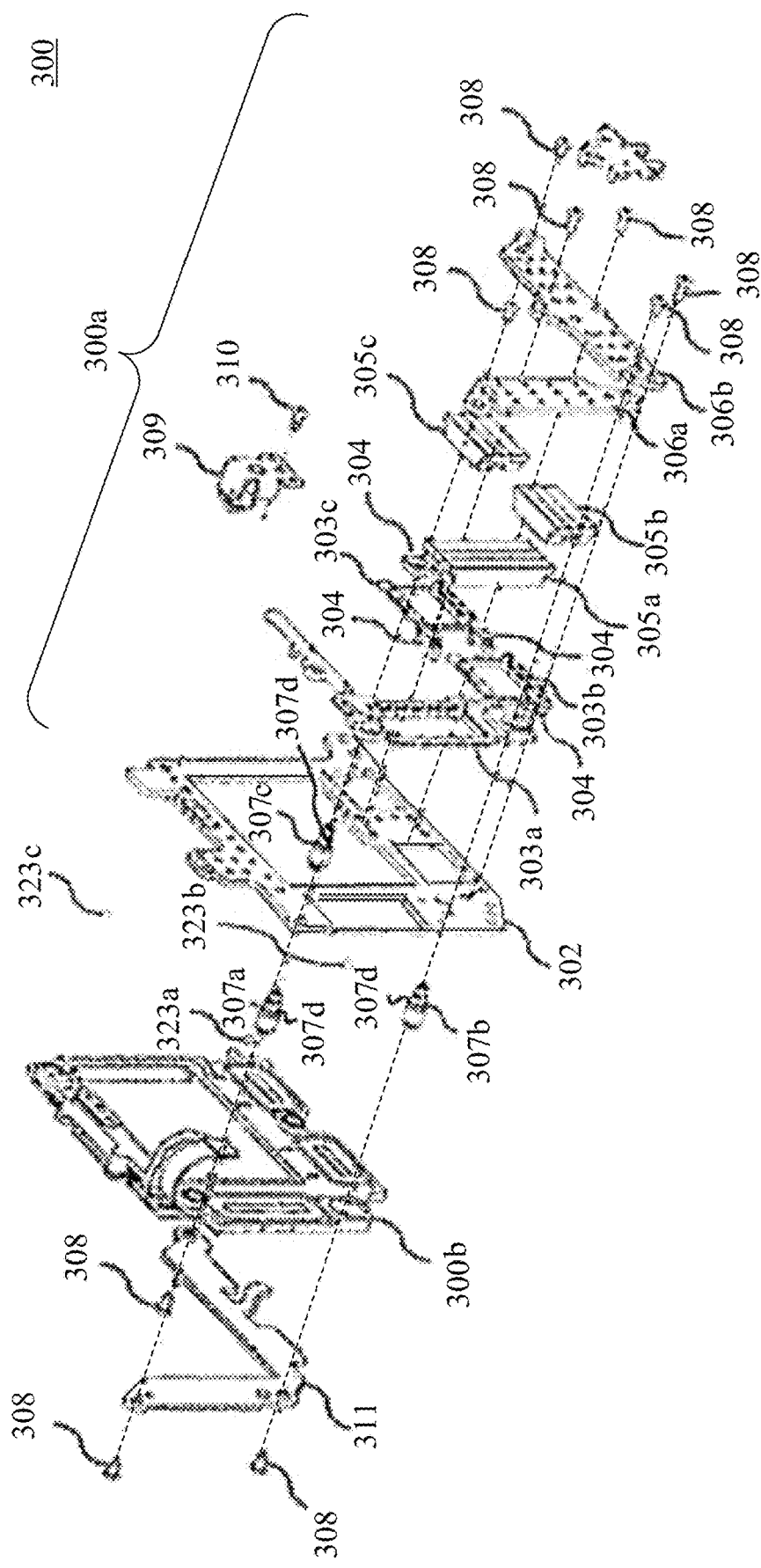
FIG. 5 is an exploded perspective view illustrating the image-stabilization mechanism viewed from image sensor side according to each embodiment.

Next, with reference to FIGS. 4 and 5, a description will be given of a configuration of the image-stabilization mechanism 300 as the driving apparatus in this embodiment. FIG. 4 is an exploded perspective view illustrating the image-stabilization mechanism 300 as viewed from the object side. FIG. 5 is an exploded perspective view illustrating the image-stabilization mechanism 300 as viewed from the image sensor side. The image-stabilization mechanism 300 includes a fixed portion 300a and a movable portion 300b.

The fixed portion 300a includes a fixed member 302, a first frame member 303a, a second frame member 303b, a third frame member 303c, a first magnet group 305a, a second magnet group 305b, and a third magnet group 305c. The fixed member 302 includes a first opening 302a, a second opening 302b, and a third opening 302c. Outer sides of the first opening 302a, the second opening 302b, and the third opening 302c are engaged with the first frame member 303a, the second frame member 303b, and the third frame member 303c, respectively. Inner sides of the first frame member 303a, the second frame member 303b, and the third frame member 303c engages with the first magnet group 305a, the second magnet group 305b, and the third magnet group 305c, respectively. Each of the first magnet group 305a, the second magnet group 305b, and the third magnet group 305c forms a Halbach magnetic circuit by three magnets having different magnetizing directions.

The fixed portion 300a includes a first rear yoke 306a, a second rear yoke 306b, and a plurality of spacer members 304. On a projection of the optical-axis orthogonal plane 401c, the rear yokes 306a and 306b are disposed so that the first rear yoke 306a covers the first magnet group 305a and the second rear yoke 306b covers the second magnet group 305b and the third magnet group 305c. These rear yokes 306a and 306b come into contact with the plurality of spacer members 304 disposed between the fixed member 302 and the rear yokes 306a and 306b and the positions of the rear yokes 306a and 306b in the optical axis 401a direction are specified.

The fixed portion 300a includes a first column member 307a, a second column member 307b, and a third column member 307c each of which has a contact surface 307d. The first column member 307a, the second column member 307b, and the third column member 307c engage with the fixed member 302, respectively. Each contact surface 307d contacts the fixed member 302, and positions of the column members in the optical axis 401a direction are specified.

As described above, the plurality of spacer members 304 specify the positions of the first rear yoke 306a and the second rear yoke 306b relative to the fixed member 302. Each contact surface 307d specifies the position of each of the first column member 307a, the second column member 307b, and the third column member 307 relative to the fixed member 302. At the specified position, screw members 308 fix the first rear yoke 306a to the first column member 307a and the second column member 307b while the fixed member 302 is sandwiched. At the specified position, the screw members 308 fix the second rear yoke 306b to the fixed member 302, and fixes the second rear yoke 306b to the third column member 307c while the fixed member 302 is sandwiched. In this way, the first rear yoke 306a, the second rear yoke 306b, the first column member 307a, the second column member 307b, and the third column member 307c are fixed to the fixed member 302.

Each of the first magnet group 305a, the second magnet group 305b, and the third magnet group 305c includes a flange portion 305d. Each of the fixed member 302, the first rear yoke 306a, and the second rear yoke 306b fixes each magnet group by pressing the flange portion 305d. This embodiment describes the plurality of magnet sequences forming the Halbach magnetic circuit, but the configuration may be different from that of the Halbach magnetic circuit, and may be a configuration such as magnetizing one magnet with a plurality of poles.

The fixed portion 300a includes a limiting member 309 and a fastening member 310. The fastening member 310 fixes the limiting member 309 to the fixed member 302. The limiting member 309 and the fastening member 310 limit a movement of the movable portion 300b, as described later. The fixed portion 300a includes a front yoke 311. The screw members 308 fix the front yoke 311 to the first column member 307a, the second column member 307b, and the third column member 307c. The fixed portion 300a includes a magnet 312. Adhesive or the like fixes the magnet 312 to the fixed member 302.

Figure 6:
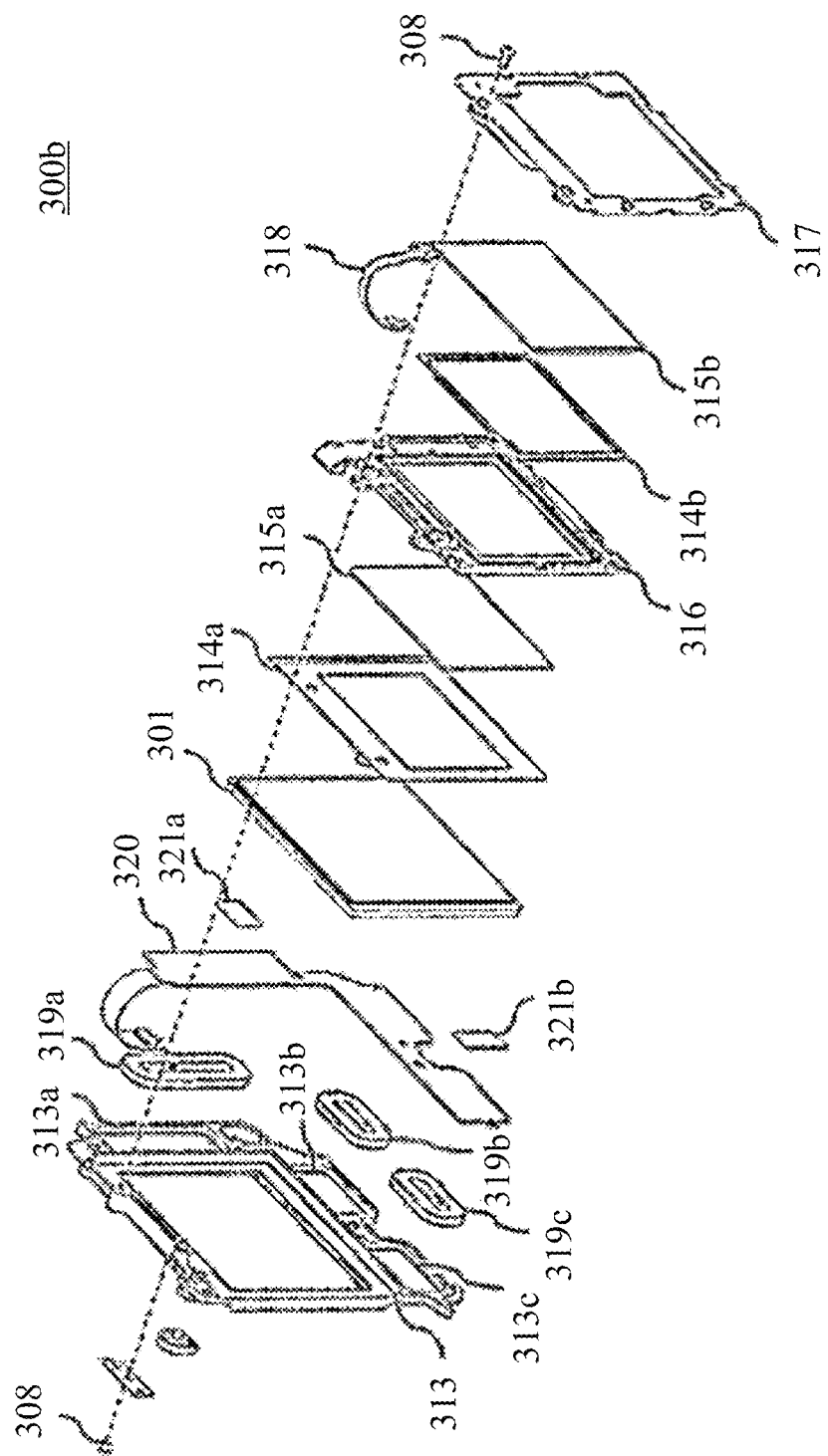
FIG. 6 is an exploded perspective view illustrating a movable portion of the image-stabilization mechanism according to each embodiment.

Next, a configuration will be described of the movable portion 300b with reference to FIGS. 6 and 7. FIG. 6 is an exploded perspective view illustrating the movable portion 300b of the image-stabilization mechanism 300. As illustrated in FIG. 6, the movable portion 300b includes a movable member 313 and the image sensor 301. Adhesive or the like fixes the image sensor 301 to the movable member 313. A first mask 314a, a second mask 314b, an infrared absorption filter 315a, and an optical low-pass filter 315b are held by a holder member 316 and a holder sheet metal 317, and are fixed to the image sensor 301 with an adhesive member or the like. The first mask 314a and the second mask 314b prevent extra light from outside an image pickup optical path from entering the image sensor 301. The optical low-pass filter 315b includes a vibration mechanism 318 configured to remove foreign substance attached to its surface by vibration, but the more detailed principle and control are known, and therefore the description thereof will be omitted.

The movable portion 300b includes a first coil 319a, a second coil 319b, a third coil 319c, a driving FPC 320, a first attraction sheet metal 321a, and a second attraction sheet metal 321b. The movable member 313 includes a first opening 313a, a second opening 313b, and a third opening 313c. The first coil 319a is disposed inside the first opening 313a, the second coil 319b is disposed inside the second opening 313b, and the third coil 319c is disposed inside the third opening 313c, and adhesive or the like fixes the coils to the movable member 313.

On the projection of the optical-axis orthogonal plane 401c, the driving FPC 320 is disposed so that the driving FPC covers the first coil 319a, the second coil 319b, and the third coil 319c. Adhesive or the like fixes the driving FPC 320 to the movable member 313. The first coil 319a, the second coil 319b, and the third coil 319c are electrically connected to the driving FPC 320, and energization determined by the image-stabilization control unit 216a is performed via the driving FPC 320.

Adhesive or the like fixes the first attraction sheet metal 321a and the second attraction sheet metal 321b to the driving FPC 320. The first attraction sheet metal 321a and the second attraction sheet metal 321b respectively overlap the first magnet group 305a and the third magnet group 305c of the fixed portion 300a on the projection of the optical-axis orthogonal plane 401c. By the first magnet group 305a and the third magnet group 305c attracting these attraction sheet metals, a biasing force is generated in the movable portion 300b.

Figure 7:
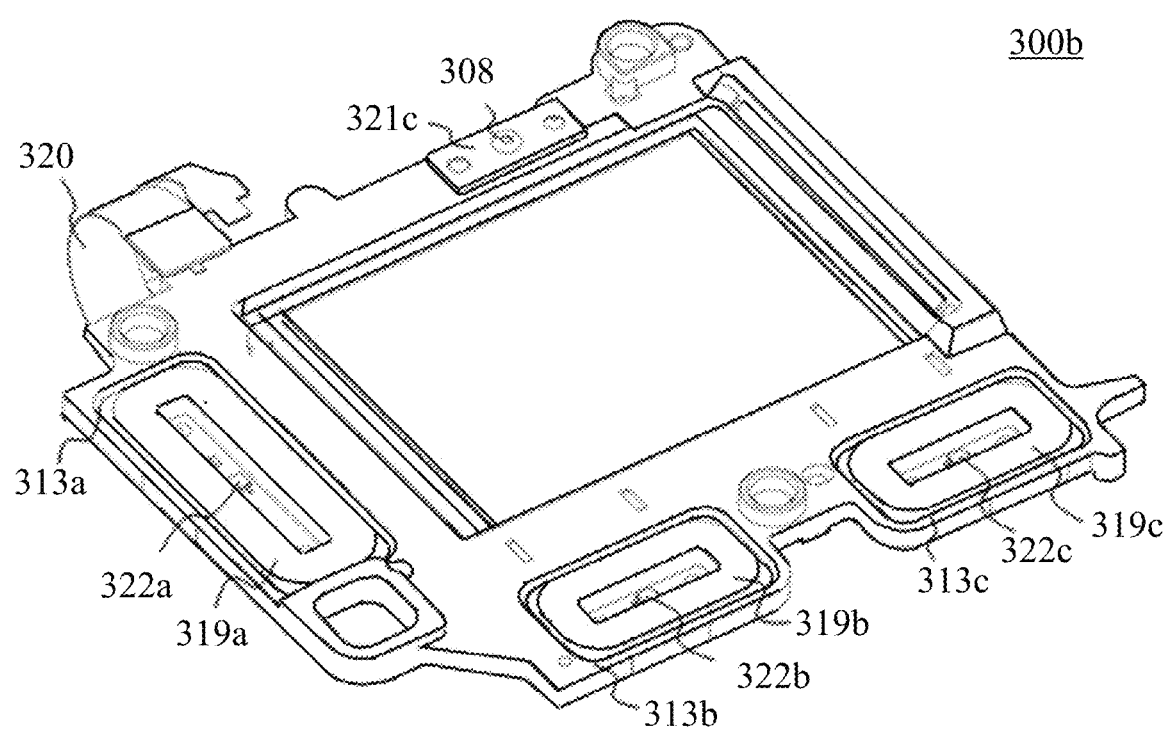
FIG. 7 is a perspective view illustrating the movable portion of the image-stabilization mechanism according to each embodiment.

FIG. 7 is a perspective view illustrating the movable portion 300b. As illustrated in FIG. 7, the driving FPC 320 includes a first detector 322a, a second detector 322b, and a third detector 322c. The first detector 322a, the second detector 322b, and the third detector 322c are disposed inside the first coil 319a, the second coil 319b, and the third coil 319c, respectively. The first detector 322a, the second detector 322b, and the third detector 322c are Hall elements. As described later, these detectors detect the magnetic forces of the facing magnets, and the image-stabilization control unit 216a calculates the position of the movable portion 300b on the optical-axis orthogonal plane 401c relative to the fixed portion 300a.

The movable portion 300b includes a third attraction sheet metal 321c. One of the screw members 308 fixes the third attraction sheet metal 321c to the movable member 313. The third attraction sheet metal 321c faces the magnet 312 of the fixed portion 300a. The magnet 312 generates a biasing force in the movable portion 300b by attracting the third attraction sheet metal 321c.

A first rolling member 323a, a second rolling member 323b, and a third rolling member 323c are disposed inside a first enclosing portion 313d, a second enclosing portion 313e, and a third enclosing portion 313f of the movable member 313. A biasing force is generated by the first attraction sheet metal 321a and the second attraction sheet metal 321b, and the first magnet group 305a and the third magnet group 305c, and the biasing force is generated by the third attraction sheet metal 321c and the magnet 312. These biasing forces force the movable portion 300b to the fixed member 302 via the first rolling member 323a, the second rolling member 323b, and the third rolling member 323c. When the movable portion 300b moves relative to the fixed portion 300a, the first rolling member 323a, the second rolling member 323b, and the third rolling member 323c roll, and thus a load due to friction hardly occurs.

The first coil 319a and the first magnet group 305a, the second coil 319b and the second magnet group 305b, and the third coil 319c and the third magnet group 305c respectively face each other, and each pair forms a VCM, i.e., a voice coil motor. The first coil 319a and the first magnet group 305a form a first actuator. The second coil 319b and the second magnet group 305b form a second actuator 324b, and the third coil 319c and the third magnet group 305c form a third actuator. The image sensor 301 has a substantially rectangular shape, and in the optical-axis orthogonal plane 401c, a direction orthogonal to a short side is referred to as an X direction and a direction orthogonal to a long side is referred to as a Y direction.

The first actuator is disposed along the short side of the image sensor 301 in the X direction. The first magnet group 305a has a magnetic circuit configuration in which a magnetic force changes in the X direction, and the first actuator generates a driving force in the X direction based on an energization direction of the first coil 319a. The second actuator and the third actuator are disposed side by side along the long side of the image sensor 301 in the Y direction. The second magnet group 305b and the third magnet group 305c respectively have magnetic circuit configurations in each of which the magnetic force changes in the Y direction. The second actuator and the third actuator generate driving forces in the Y direction based on energization directions of the second coil 319b and the third coil 319c. The second actuator and the third actuator are arranged substantially symmetrically with respect to the optical axis 401a in the X direction. A rotational force occurs around the optical axis 401a due to a difference in the driving forces between the second actuator and the third actuator.

Based on the shake amount detected by the shake detection unit 217b, that is also referred to as a detected shake amount hereinafter, the movable portion 300b is driven in the X direction and the Y direction, and in the rotation direction around the optical axis 401a with the above method so that blur is reduced or cancelled. As a result, an image is acquired with reduced blur.

In the electronic-front-curtain image pickup mode, an image is generated by exposing the image sensor 301 to the light that has passed through an area, that is a slit, between the reset scanning of the image sensor 301, i.e., an electronic front curtain, and the rear blade group 5 of the focal plane shutter 218 following the electronic front curtain. When the shake detection unit 217a of the image pickup apparatus 200 detects shake, the movable portion 300b having the image sensor 301 is driven so that blur is reduced. On the other hand, the focal plane shutter 218 is fixed to the frame member (not illustrated). Thus, when the movable portion 300b operates during traveling of the electronic front curtain, the width of the slit changes between the electronic front curtain and the following rear blade group 5. For acquisition of an image with proper exposure, it is important to maintain the width of the slit between the electronic front curtain and the following rear blade group 5. If the width of the slit changes, the amount of light to which the image sensor 301 is exposed changes, and exposure characteristics of the image deteriorate.

For example, if the movable portion 300b is controlled to be driven in the Y direction during image pickup, the width of the slit between the electronic front curtain and the following rear blade group 5 is narrowed or widened, and an image darker or brighter than that with proper exposure is acquired. If the movable portion 300b is controlled to be driven in the rotation direction around the optical axis 401a during image pickup, the electronic front curtain tilts relative to the rear blade group 5, and an image having different brightness on the left and right is acquired.

Hence, in the electronic-front-curtain image pickup mode, it is important that the image-stabilization mechanism 300 provides control on the image stabilization based on the shutter speed at the time of image pickup, so that the image is not affected even if the movable portion 300b operates during traveling of the electronic front curtain.

In the mechanical-shutter image pickup mode, the front blade group 4 and the rear blade group 5 travel while forming an area, that is a slit. An image is generated by exposing the image sensor 301 to the light passing through the slit. When the shake detection unit 217a of the image pickup apparatus 200 detects shake, the movable portion 300b having the image sensor 301 is driven so that blur is reduced. However, since the focal plane shutter 218 is fixed to the frame member (not illustrated), the width of the area, that us the slit, formed by the front blade group 4 and the rear blade group 5 does not change by driving of the movable portion 300b having the image sensor 301. For acquisition of an image with proper exposure, it is important to maintain the width of the slit formed by the front blade group 4 and the rear blade group 5.

Next, a description will be given of operation of the image-stabilization mechanism 300 in the image pickup modes of the image pickup apparatus 200 in this embodiment. The image pickup apparatus 200 of this embodiment has two image pickup modes, the mechanical-shutter image pickup mode, that is also referred to as a first mode, and the electronic-front-curtain image pickup mode, that is also referred to as a second mode.

Mechanical-Shutter Image Pickup Mode

When the mechanical-shutter image pickup mode is selected as the image pickup mode, the image pickup apparatus 200 performs image stabilization by the image-stabilization mechanism 300, that is also referred to as first image stabilization, regardless of the shutter speed set by the user.

In the mechanical-shutter image pickup mode, the front blade group 4 and the rear blade group 5 mounted on the focal plane shutter 218 travel while forming the slit, the image sensor 301 is exposed to the light passing through the slit, and an image is formed. Therefore, the light amount of light passing through the slit between the front blade group 4 and the rear blade group 5 does not change depending on whether the first image stabilization by the image-stabilization mechanism 300 is on or off. The light amount of light to which the image sensor 301 is exposed changes depending on the moving speed of the movable portion 300b having the image sensor 301. However, the driving of the image-stabilization mechanism 300 has only a slight effect on the exposure of the image, because the moving speed of the movable portion 300b is slow relative to the traveling speed of the blade group. Hence, in the mechanical-shutter image pickup mode, the driving of the image-stabilization mechanism 300 is not limited with any set shutter speed. In other words, the image stabilization control by the image-stabilization mechanism 300 is performed with any set shutter speed.

Electronic-Front-Curtain Image Pickup Mode

In the electronic-front-curtain image pickup mode selected as the image pickup mode, even when the user sets the image stabilization control of the image-stabilization mechanism 300, the first image stabilization, to on, the driving of the image-stabilization mechanism 300 is prohibited in a case where the shutter speed is faster than a predetermined speed. That is, in this case, the first image stabilization is turned off during image pickup. On the other hand, when the shutter speed is slower than the predetermined speed, during image pickup, the image stabilization control is performed by the image-stabilization mechanism 300, that is, the driving of the image-stabilization mechanism 300 is allowed. The predetermined shutter speed is, for example, 1/1000 second, but is not limited to this.

In the electronic-front-curtain image pickup mode, as described above, an image is formed by exposing the image sensor 301 to light passing through the slit between the electronic front curtain and the following rear blade group 5. When the image-stabilization mechanism 300 is driven during the image pickup, the image sensor 301 mounted on the movable portion 300b operates. Therefore, the light amount of light passing through the slit between the electronic front curtain and the following rear blade group 5 changes from the proper exposure amount. Depending on the driving amount of the image-stabilization mechanism 300, the exposure changes in the image. The faster the shutter speed, the narrower the width of the slit between the electronic front curtain and the following rear blade group 5. Thus, the exposure of the image may be largely affected by the driving of the movable portion 300b when the width changes of the slit between the electronic front curtain and the following rear blade group 5, and the image may not be acquired with the proper exposure.

When the shutter speed is faster than the predetermined speed, the exposure period of the image sensor 301 is short, and thus the effect of the camera shake is small on the image even when the operation of the image-stabilization mechanism 300, i.e., the first image stabilization, is turned off. Hence, in order to prevent the exposure characteristics of the image from being decreased by driving the image-stabilization mechanism 300, this embodiment turns off the image stabilization control by the image-stabilization mechanism 300, that is the first image stabilization, when the shutter speed is faster than the predetermined speed.

On the other hand, when the shutter speed is slower than the predetermined speed, the exposure period of the image sensor 301 is long. Therefore, even when the light passing through the slit between the electronic front curtain and the following rear blade group 5 changes from the proper exposure amount, the effect on the exposure of the image is small. Hence, when the shutter speed is slow, the driving of the image-stabilization mechanism 300 is not limited, that is, the image stabilization control is performed by the image-stabilization mechanism 300.

As described above, the image pickup apparatus 200 of this embodiment includes the image sensor 301 configured to acquire an image and the image-stabilization mechanism 300 configured to reduce blur by moving the image sensor 301 based on the shake amount detected by the shake detection unit 217a. The image pickup apparatus 200 includes a shutter apparatus (focal plane shutter 218) having the front blade group 4 and the rear blade group 5, and a control unit (image-stabilization control unit 216a) configured to provide control on the image stabilization by the image-stabilization mechanism 300. The image sensor 301 has a first mode (mechanical-shutter image pickup mode) and a second mode (electronic-front-curtain image pickup mode). The first mode is a mode for acquiring an image based on the light passing through the area (slit) formed by the front blade group 4 and the rear blade group 5. The second mode is a mode for acquiring an image based on the light passing through the area (slit) between the electronic front curtain of the image sensor 301 and the rear blade group 5. The control unit is configured to provide control on the image stabilization in the first mode, and to determine whether or not to provide control on the image stabilization based on the shutter speed of the shutter apparatus in the second mode.

The image pickup apparatus 200 may include a setting unit (CPU 204) configured to set the shutter speed. In the second mode, the control unit does not provide the control on the image stabilization when the shutter speed set by the setting unit is faster than the predetermined shutter speed. On the other hand, in the second mode, the control unit provides the control on the image stabilization when the shutter speed is slower than the predetermined shutter speed. The image pickup apparatus 200 of this embodiment can acquire an image with the proper exposure while properly performing the image stabilization.

Second Embodiment

Next, a description will be given of an image pickup apparatus in the second embodiment according to the present invention. The image pickup apparatus of this embodiment is different from the image pickup apparatus of the first embodiment in having, as an image pickup mode, an electronic shutter mode (third mode) in addition to the mechanical-shutter image pickup mode (first mode) and the electronic-front-curtain image pickup mode (second mode) of the first embodiment. Hereinafter, a description will be given of operation of the image-stabilization mechanism 300, i.e., control on image stabilization, in the electronic shutter mode. Other configurations and operation of the image pickup apparatus of this embodiment are the same as those of the image pickup apparatus of the first embodiment, and thus the description thereof will be omitted.

Electronic Shutter Mode

When the electronic shutter mode is selected, the CPU 204 of the image pickup apparatus provides control on the image stabilization by the image-stabilization mechanism 300, that is the first image stabilization, with any shutter speed set by the user. That is, when the user sets the first image stabilization to on, an image is captured while the first image stabilization is turned on, and when the user sets the first image stabilization to off, an image is captured while the first image stabilization is turned off.

In the electronic shutter mode, the CPU 204 electrically controls accumulation start and accumulation end of electric charges generated by the light entering the image pickup plane 301a of the image sensor 301. Therefore, during image pickup, the exposure amount to the image sensor 301 is not changed by the driving of the image-stabilization mechanism 300, but changed depending only on the moving speed of the movable portion 300b having the image sensor 301. The moving speed of the movable portion 300b is slow relative to the charge accumulation start scanning and the accumulation end scanning of the image sensor 301, and thus the driving of the image-stabilization mechanism 300 has small effect on the exposure of the image. Hence, in the electronic shutter mode, this embodiment does not limit the driving of the image-stabilization mechanism 300 with any set shutter speed, that is, the image stabilization control is performed by the image-stabilization mechanism 300 with any set shutter speed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to each embodiment, it is possible to provide an image pickup apparatus, a control method, and a memory medium each of which can acquire an image with proper exposure while properly performing image stabilization.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-054705, filed on Mar. 25, 2020 which is hereby incorporated by reference herein in its entirety.

What is claimed is:

1. An image pickup apparatus comprising:
an image sensor configured to acquire an image;
an image-stabilization mechanism configured to reduce blur by moving the image sensor based on a shake amount detected by a shake detection unit;
a shutter apparatus including a front blade group and a rear blade group;
a setting unit configured to set a shutter speed of a shutter apparatus; and
a control unit configured to provide control on image stabilization by the image-stabilization mechanism,
wherein the image sensor has a first mode for acquiring the image based on light passing through an area formed by the front blade group and the rear blade group, and a second mode for acquiring the image based on light passing through an area between an electronic front curtain of the image sensor and the rear blade group,
wherein in the first mode, the control unit provides the control on the image stabilization, and
wherein in the second mode, the control unit determines whether or not to provide the control on the image stabilization, based on the shutter speed set by the setting unit, and when the shutter speed set by the setting unit is faster than a predetermined shutter speed, the control unit does not provide the control on the image stabilization.

2. The image pickup apparatus according to claim 1, wherein in the second mode, when the shutter speed is slower than the predetermined shutter speed, the control unit provides the control on the image stabilization.

3. The image pickup apparatus according to claim 2, wherein in the first mode, the control unit allows driving of the image-stabilization mechanism,
wherein in the second mode, when the shutter speed is faster than the predetermined shutter speed, the control unit prohibits the driving of the image-stabilization mechanism, and
wherein in the second mode, when the shutter speed is slower than the predetermined shutter speed, the control unit allows the driving of the image-stabilization mechanism.

4. The image pickup apparatus according to claim 1, wherein the image sensor is mounted on the image-stabilization mechanism, and
wherein the image-stabilization mechanism is configured to move the image sensor so as to reduce the blur, based on the shake amount detected by the shake detection unit.

5. The image pickup apparatus according to claim 1, wherein the image sensor further has a third mode for acquiring the image by electrically controlling accumulation start and accumulation end of charges, and
wherein in the third mode, the control unit provides the control on the image stabilization.

6. A control method comprising steps of:
setting a shutter speed of a shutter apparatus;
acquiring an image by using an image sensor; and
reducing blur by providing control on image stabilization by an image-stabilization mechanism and moving the image sensor based on a shake amount detected by a shake detection unit;
wherein the image sensor has a first mode for acquiring the image based on light passing through an area formed by a front blade group and a rear blade group of the shutter apparatus, and a second mode for acquiring the image based on light passing through an area between an electronic front curtain of the image sensor and the rear blade group,
wherein in the first mode, the step of reducing blur provides the control on the image stabilization, and
wherein in the second mode, the step of reducing blur determines whether or not to provide the control on the image stabilization, based on the shutter speed set in the step of setting, and when the shutter speed is faster than a predetermined shutter speed, the step of reducing blur does not provide the control on the image stabilization.

7. A non-transitory computer-readable storage medium storing a computer program that causes a computer to execute a control method,
wherein the control method includes steps of:
setting a shutter speed of a shutter apparatus;
acquiring an image by using an image sensor; and
reducing blur by providing control on image stabilization by an image-stabilization mechanism and moving the image sensor based on a shake amount detected by a shake detection unit;
wherein the image sensor has a first mode for acquiring the image based on light passing through an area formed by a front blade group and a rear blade group of the shutter apparatus, and a second mode for acquiring the image based on light passing through an area between an electronic front curtain of the image sensor and the rear blade group,
wherein in the first mode, the step of reducing blur provides the control on the image stabilization, and
wherein in the second mode, the step of reducing blur determines whether or not to provide the control on the image stabilization, based on the shutter speed set in the step of setting, and when the shutter speed is faster than a predetermined shutter speed, the step of reducing blur does not provide the control on the image stabilization.

* * * * *